(12) United States Patent
Koch

(10) Patent No.: US 8,677,675 B2
(45) Date of Patent: Mar. 25, 2014

(54) MULTI-PRONGED SPEAR-FISHING SPEAR TIP

(76) Inventor: Christopher A. Koch, Easton, MD (US)

(*) Notice: Subject to any disclaimer, the term of this patent is extended or adjusted under 35 U.S.C. 154(b) by 237 days.

(21) Appl. No.: 13/297,113

(22) Filed: Nov. 15, 2011

(65) Prior Publication Data

US 2013/0118052 A1 May 16, 2013

(51) Int. Cl.
*A01K 81/04* (2006.01)
(52) U.S. Cl.
USPC ............... 43/6; 294/61; 294/126; 294/127; 294/128; 294/182
(58) Field of Classification Search
USPC .................. 43/5, 6; 294/126–130, 61, 182
See application file for complete search history.

(56) References Cited

U.S. PATENT DOCUMENTS

| | | | | | |
|---|---|---|---|---|---|
| 166,171 | A | * | 7/1875 | White | 294/61 |
| 172,312 | A | * | 1/1876 | Hedges | 43/6 |
| 218,540 | A | * | 8/1879 | Knowles | 43/6 |
| 362,183 | A | * | 5/1887 | Runyon | 43/6 |
| 923,573 | A | * | 6/1909 | Perry | 43/6 |
| 1,053,418 | A | * | 2/1913 | Martin | 294/61 |
| 1,121,657 | A | * | 12/1914 | Parker | 294/61 |
| 1,172,780 | A | * | 2/1916 | Ferree | 43/36 |
| 1,227,035 | A | * | 5/1917 | Boudreau | 294/61 |
| 1,234,291 | A | * | 7/1917 | Conrad | 43/6 |
| 1,297,344 | A | * | 3/1919 | Glass | 43/6 |
| 1,399,249 | A | * | 12/1921 | Brown | 43/6 |
| 1,465,267 | A | * | 8/1923 | Henry | 43/6 |
| 1,506,068 | A | * | 8/1924 | Lange | 43/6 |
| 1,571,751 | A | * | 2/1926 | Castellan | 43/6 |
| 1,581,321 | A | * | 4/1926 | Raithel | 43/6 |
| 1,621,082 | A | * | 3/1927 | Pflueger | 43/6 |
| 2,000,146 | A | * | 5/1935 | Penn | 43/6 |
| 2,115,266 | A | * | 4/1938 | Johnson | 294/126 |
| D114,893 | S | * | 5/1939 | Goddeyne | 43/6 |
| 2,194,618 | A | * | 3/1940 | Scramlin | 43/6 |
| 2,238,504 | A | * | 4/1941 | Pearson | 43/6 |
| 2,301,789 | A | * | 11/1942 | Pearson | 43/6 |
| 2,404,249 | A | * | 7/1946 | Potter | 43/6 |
| 2,442,974 | A | * | 6/1948 | Frederiksen | 43/6 |
| 2,492,035 | A | * | 12/1949 | Doble | 294/50.6 |
| 2,509,113 | A | * | 5/1950 | Sweet | 294/61 |
| 2,510,641 | A | * | 6/1950 | Koscher | 294/61 |
| 2,529,938 | A | * | 11/1950 | Hearndon | 294/61 |
| 2,550,376 | A | * | 4/1951 | Peterson | 43/36 |

(Continued)

FOREIGN PATENT DOCUMENTS

| | | |
|---|---|---|
| GB | 614521 | 12/1948 |
| GB | 719905 | 12/1954 |

(Continued)

*Primary Examiner* — Darren W Ark
(74) *Attorney, Agent, or Firm* — Richard C. Litman

(57) ABSTRACT

The multi-pronged spear-fishing spear tip includes a collar for mounting the multi-pronged spear-fishing spear tip onto a spear shaft. An elongate center tine extends axially from the collar and includes a spear point for piercing fish or prey. A plurality of diverging tines with piercing tips surround the center tine, the diverging tines immobilizing the fish or prey pierced by the center tine. Each diverging tine extends from the collar at a diverging angle from the axis of the collar. The length of the center tine is longer than the length of the diverging tines to accommodate most sizes of fish or prey. This construction provides the functionality of a single-point spear and a paralyzer spear in a single unit.

7 Claims, 4 Drawing Sheets

(56) References Cited

U.S. PATENT DOCUMENTS

| | | | | |
|---|---|---|---|---|
| 2,598,230 A | * | 5/1952 | Dann | 43/5 |
| 2,616,201 A | * | 11/1952 | Rakiker | 43/6 |
| 2,690,925 A | * | 10/1954 | Reis | 294/61 |
| 2,732,242 A | * | 1/1956 | Belford | 294/61 |
| 2,753,643 A | * | 7/1956 | Recker | 43/6 |
| 2,770,905 A | * | 11/1956 | Efraimson | 43/6 |
| 2,794,668 A | * | 6/1957 | Christensen | 43/6 |
| 2,809,067 A | * | 10/1957 | Macchi | 294/61 |
| 2,904,338 A | * | 9/1959 | Podufal | 43/6 |
| 2,947,562 A | * | 8/1960 | Doolittle | 294/61 |
| 2,951,306 A | * | 9/1960 | Woodfield | 43/6 |
| 3,004,362 A | * | 10/1961 | Day | 43/6 |
| 3,014,305 A | * | 12/1961 | Yurchich | 43/6 |
| 3,036,395 A | * | 5/1962 | Nelson | 43/6 |
| 3,061,270 A | * | 10/1962 | Lowe | 294/61 |
| 3,164,385 A | * | 1/1965 | Shure | 473/582 |
| 3,216,141 A | * | 11/1965 | Walger | 43/6 |
| 3,340,642 A | * | 9/1967 | Vasiljevic | 43/6 |
| D211,637 S | * | 7/1968 | McKusick | 43/6 |
| 3,486,265 A | * | 12/1969 | Cheesebrew | 43/6 |
| 3,596,966 A | * | 8/1971 | Shredl | 294/61 |
| 3,600,835 A | * | 8/1971 | Hendricks | 43/6 |
| 3,658,371 A | * | 4/1972 | Dowdey | 294/61 |
| 3,741,190 A | * | 6/1973 | Lopez | 43/6 |
| D228,337 S | * | 9/1973 | Maynard | 294/61 |
| 3,772,814 A | * | 11/1973 | Sylvester et al. | 43/6 |
| 4,004,539 A | * | 1/1977 | Wesson | 43/5 |
| 4,052,808 A | * | 10/1977 | Crabtree | 43/6 |
| 4,272,905 A | * | 6/1981 | Hinkle | 43/6 |
| 4,463,981 A | * | 8/1984 | Curry | 294/61 |
| 4,685,239 A | * | 8/1987 | LaMonica | 43/6 |
| 4,718,189 A | * | 1/1988 | Stude | 43/6 |
| 4,742,637 A | * | 5/1988 | Musacchia | 43/6 |
| 4,819,360 A | * | 4/1989 | Thomas | 43/6 |
| 4,901,467 A | * | 2/1990 | Stolpe | 43/6 |
| 4,905,397 A | * | 3/1990 | Juelg, Jr. | 43/6 |
| 4,924,619 A | * | 5/1990 | Dowell | 43/6 |
| 4,982,523 A | * | 1/1991 | Garton | 43/6 |
| 5,163,242 A | * | 11/1992 | Smith | 43/6 |
| D332,129 S | * | 12/1992 | Bice | D22/149 |
| 5,490,701 A | | 2/1996 | Glass | |
| 5,566,858 A | * | 10/1996 | Ducker, III | 43/6 |
| 5,570,530 A | * | 11/1996 | Lee | 43/6 |
| 5,600,914 A | * | 2/1997 | Tatar | 43/6 |
| D409,710 S | | 5/1999 | Bauer | |
| 6,484,432 B1 | * | 11/2002 | Walger, Jr. | 43/6 |
| 6,883,264 B1 | * | 4/2005 | Gimbel | 43/6 |
| 7,571,564 B2 | * | 8/2009 | Sullivan | 43/6 |
| 8,061,746 B1 | * | 11/2011 | Stephens, III | 294/61 |
| 8,544,455 B1 | * | 10/2013 | Bruington | 43/6 |
| 2013/0055620 A1 | * | 3/2013 | Estabrook et al. | 43/6 |

FOREIGN PATENT DOCUMENTS

| | | | |
|---|---|---|---|
| JP | 2002360122 A | * 12/2002 | A01K 81/04 |
| WO | WO 81/03107 A1 | 11/1981 | |
| WO | WO 8103107 A1 | * 11/1981 | A01K 81/04 |

* cited by examiner

MULTI-PRONGED SPEAR-FISHING SPEAR TIP

BACKGROUND OF THE INVENTION

1. Field of the Invention

The present invention relates to fishing equipment, and particularly to a multi-pronged spear-fishing spear tip that provides the benefits of a single-point spear tip and a paralyzer spear tip in a single unit.

2. Description of the Related Art

Spear-fishing is an ancient hunting technique for obtaining sustenance from marine animals. In some parts of the world, spear-fishing is still a mainstay of life rather than a sport. The basic technique utilizes an elongate pole with a sharpened end that a user flings at the target fish or animal either manually or with the assistance of a sling-strap attached to the spear for added velocity. Oftentimes the spear tip would include a fixed barb that prevents the prey from sliding off the spear.

Spear-fishing has advanced to spear guns powered by pneumatics or elastic bands. Modern materials and manufacturing techniques have also produced lighter, stronger and more durable spears than the typical wooden ones from the days of yore. The current spears used in spear-fishing fall into two basic categories. The first is a typical single-point spear and the second is a paralyzer spear.

The typical single-point spear includes an elongate shaft and a sharpened tip, the basic design of which has not changed much since ancient times. These types of spears can be used for a wide range and size of fish and other animals. While excellent at skewering the target prey, the typical single-point spear cannot easily immobilize the prey, even with a barbed tip, unless the single-point spear hits a killing blow.

On the other hand, the paralyzer spear is excellent at immobilizing the prey due to its design. A typical paralyzer spear includes an elongate rod or pole and a paralyzer spear tip that has several tines or prongs, usually three, spreading out from one end of the pole at divergent angles. The tines are relatively short in length. When a target prey is speared by one of theses paralyzer spears, the prey cannot easily free itself because the target is held at three penetration points in a stabilizing triangular pattern. However, the typical paralyzer spear is mostly effective for small fish or other small prey due to its limited penetration. Since the tines are spread at divergent angles from the end of the pole, the tines can only penetrate the prey's flesh a certain extent before the toughness of the flesh prevents further penetration, i.e., the tines enter the flesh at respective divergent angles that do not allow for further penetration after a certain depth. This is an issue when hunting larger fish or prey because the larger size and mass reduces the likelihood of making an incapacitating hit with the typical paralyzer spear, much less keeping the prey immobilized once hit.

In light of the above, it would be a benefit in the art of spear-fishing to provide a fishing spear with the benefits of both a single-point spear and a paralyzer spear. Thus, a multi-pronged spear-fishing spear tip solving the aforementioned problems is desired.

SUMMARY OF THE INVENTION

The multi-pronged spear-fishing spear tip includes a collar for mounting the multi-pronged spear-fishing spear tip onto a spear shaft. An elongate center tine extends axially from the collar and includes a spear point for piercing fish or prey. A plurality of diverging tines with piercing tips surround the center tine, the diverging tines immobilizing the fish or prey pierced by the center tine. Each diverging tine extends from the collar at a diverging angle from the axis of the collar. The length of the center tine is longer than the length of the diverging tines to accommodate most sizes of fish or prey. This construction provides the functionality of a single-point spear and a paralyzer spear in a single unit.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
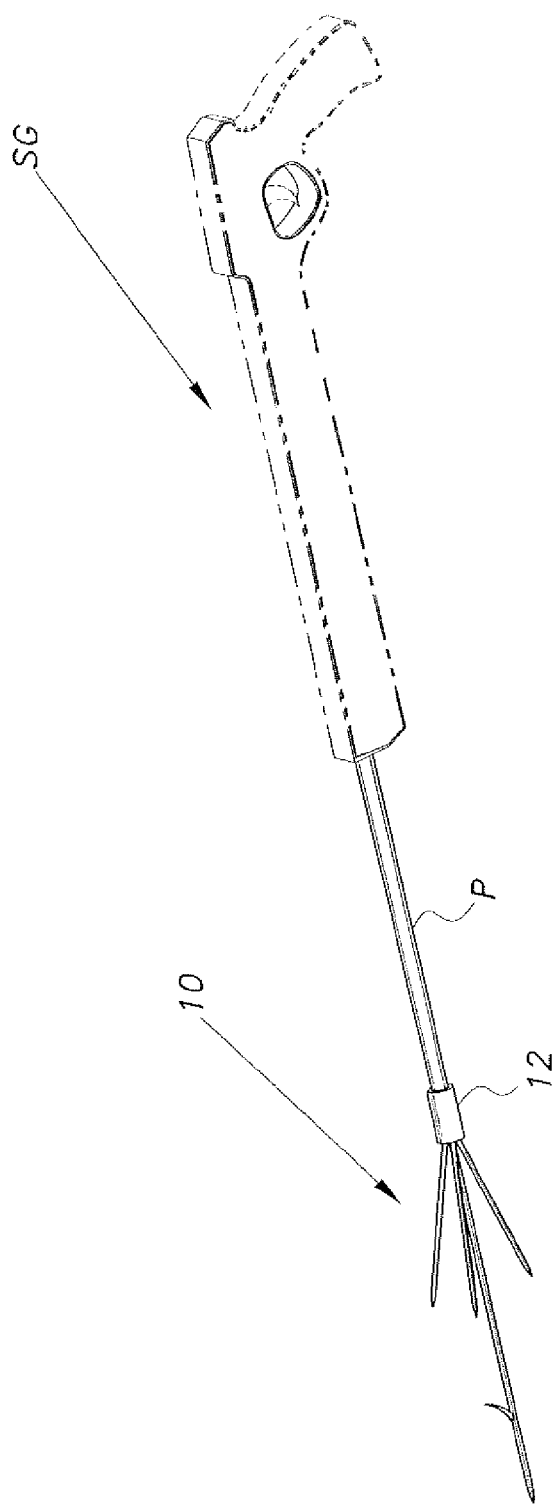
FIG. 1 is an environmental, perspective view of a multi-pronged spear-fishing spear tip according to the present invention.
Figure 2:
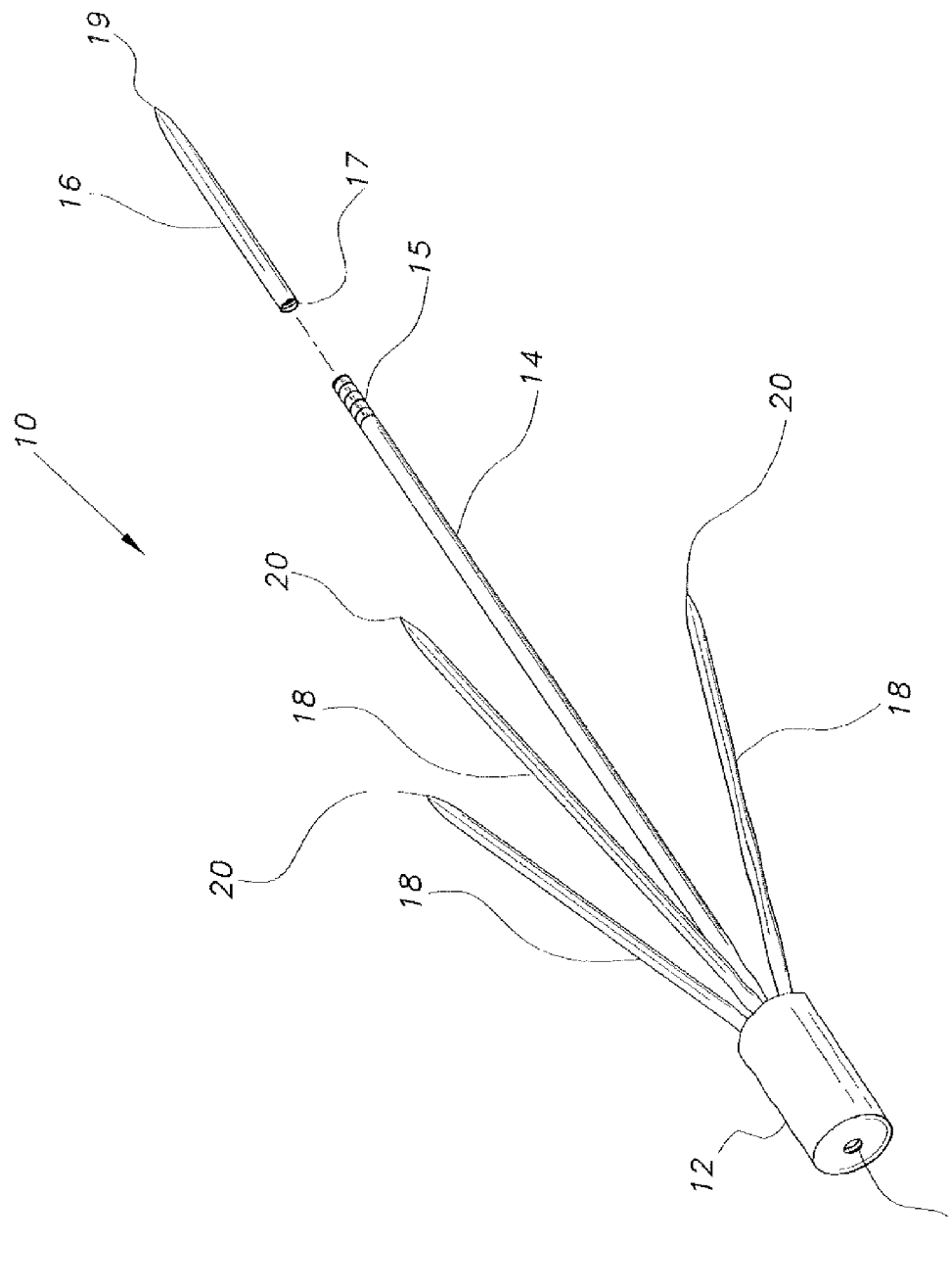
FIG. 2 is an exploded view of the multi-pronged spear-fishing spear tip shown in FIG. 1.

The multi-pronged spear-fishing spear tip, generally referred to in the drawings by the reference number 10, provides the functionality and benefits of both single-point spears and paralyzer spears in a single unit. As shown in FIGS. 1 and 2, the multi-pronged spear-fishing spear tip 10 includes a collar or ferrule 12, an elongate center tine or prong extending axially from the collar 12 and a plurality of elongate, outer prongs or tines 18 extending outward from the collar 12 at divergent angles. The collar 12 may be a cylindrical body with an internally threaded bore 13 formed in one end, as shown in FIG. 2. With this construction, the multi-pronged spear-fishing spear tip 10 can be selectively mounted to one end of a spear pole or shaft P for a spear gun SG. Alternatively, the collar 12 can be securely fixed to the pole P by adhesives or other types of fasteners. It is to be understood that the multi-pronged spear-fishing spear tip 10 is not limited to use with a spear for spear guns. The spear tip 10 can also be attached to sling spears and other pole-type projectiles.

The center tine includes an elongate center shaft 14 and a spear point 16 detachably mounted to the shaft 14 vis-à-vis respective mating threads 15 and 17. The spear point 16 includes a sharp tip 19 for piercing fish or prey. The center tine provides the functionality of a typical single-point spear, and the length thereof is longer than the outer tines 18 so that the center tine can be used to pierce various sized fish. Although the spear point 16 is preferably detachable, the spear point 16 can be provided as an integral element with the shaft 14.

Figure 3A:
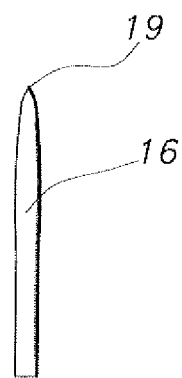
FIG. 3A is a plan view of a first embodiment of a center spear point for a multi-pronged spear-fishing spear-tip according to the present invention.
Figure 3B:
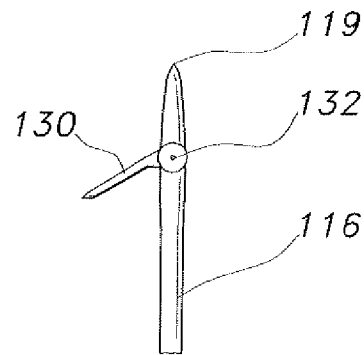
FIG. 3B is a plan view of a second embodiment of a center spear point for a multi-pronged spear-fishing spear-tip according to the present invention.
Figure 3C:
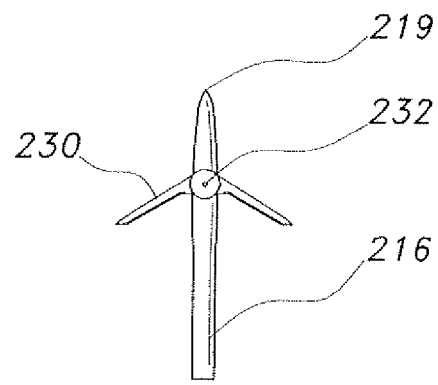
FIG. 3C is a plan view of a third embodiment of a center spear point for a multi-pronged spear-fishing spear-tip according to the present invention.

Various different spear points can be interchangeably attached to or integral with the center shaft 14. Some examples are shown in FIGS. 3A-3C. FIG. 3A shows the spear point 16 as described above. In FIG. 3B, the spear point 116 includes a sharp piercing point 119 and a retractable barb or flapper barb 130. In this embodiment, the flapper barb 130 is pivotally mounted to the spear point 116 by a biased pivot 132. In operation, the flapper barb 130 folds against the shaft of the spear point 116 as it pierces the target fish or prey. Then the flapper barb 130 unfolds upon exit or, if embedded inside the fish, the flapper barb 130 unfolds when the fish attempts to free itself, thereby substantially preventing the fish from sliding off the spear. In FIG. 3C, the spear point 216 includes a piercing tip 219 and a pair of retractable barbs or flapper barbs 230 disposed on opposite sides of the spear point 216. In this embodiment, the flapper barbs 230 are pivotally mounted to the spear point 216 by a common biased pivot 232. The operation of the spear point 216 is substantially the same as the spear point 116, but with the added assurance provided by the second barb 230. Alternatively, the barbs 130 and 230 can be an integral and rigidly fixed, non-moving feature of the center tine of the respective spear points 116 and 216.

As mentioned above, the multi-pronged spear-fishing spear tip 10 includes diverging tines 18. Each outer tine 18 includes a piercing tip 20 and a length shorter than the center tine. These tines 18 perform the function of a paralyzer spear, and it is preferred that at least three of the diverging tines 18 are provided on the multi-pronged spear-fishing spear tip 10 for optimum immobilizing performance. Two tines may adequately immobilize the speared fish if the diverging tines and the center tine do not lie in the same plane. However, this type of configuration may be imbalanced and negatively affect the accuracy of the spear.

Figure 4A:
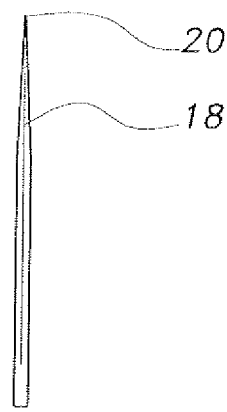
FIG. 4A is a plan view of a first embodiment of a tine for a multi-pronged spear-fishing spear-tip according to the present invention.
Figure 4B:
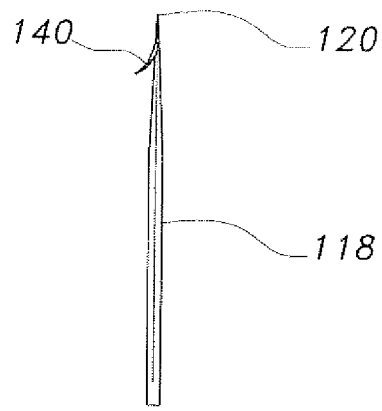
FIG. 4B is a plan view of a second embodiment of a tine for a multi-pronged spear-fishing spear-tip according to the present invention.
Figure 4C:
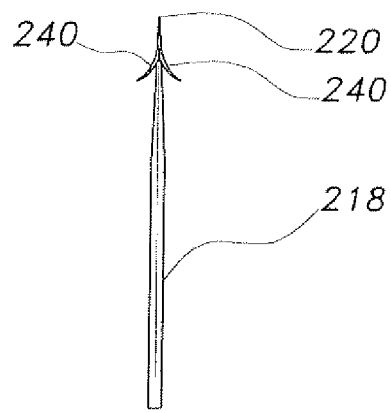
FIG. 4C is a plan view of a third embodiment of a tine for a multi-pronged spear-fishing spear-tip according to the present invention.

Various different diverging tines can be provided on the collar 12. Some alternative embodiments are shown in FIGS. 4A-4C. FIG. 4A shows the diverging tine 18 as described above. In FIG. 4B, the diverging tine 118 includes a sharp piercing point 120 and a barb 140 disposed on one side of the tine 118. In FIG. 4C, the diverging tine 218 includes a sharp piercing point 220 and a pair of barbs 240 disposed on opposite sides of the diverging tine 216. The barbs 140, 240 in the above examples perform the same function as the barbs 130, 230. Moreover, the barbs 140, 240 can be provided as rigid, integral elements of the respective tines 118, 218, or pivotally attached in a similar manner to the barbs 140, 240.

In operation, when the user launches a spear equipped with the multi-pronged spear-fishing spear tip 10, the spear point 16, 116, 216 makes the initial piercing into the target fish. The difference in length between the center tine and the diverging tines 18, 118, 218 provides enough space to accommodate most sizes of fish. Continual passage of the center tine through the fish allows the diverging tines 18, 118, 218 to make several second piercings arranged around the initial piercing to immobilize the speared fish on the center tine. In most situations, the above should be sufficient to capture the fish. However, if more immobilizing means are required or desired to prevent potential loss of prey, then the spear point 16, 116, 216 and/or the diverging tines 18, 118, 218 can be provided with the above mentioned barbs. Thus, it can be seen that the multi-pronged spear-fishing spear tip 10 combines the functionality of both a single-point spear and a paralyzer spear into a single unit.

It is to be understood that the multi-pronged spear-fishing spear tip 10 encompasses a variety of alternatives. For example, the length of the center tine can be varied by interchanging different lengths of center shafts 14 or with a telescoping center shaft 14. The collar 12 can be other geometric shapes besides a circle. Moreover, the piercing tips 19, 119, 219 can be provided in various configurations, such as bullet nose, chiseled point or rock point. Furthermore, the spear points 116 and 216 can be provided with hardware for retaining the flapper barbs 130, 230 in a folded position.

It is to be understood that the present invention is not limited to the embodiments described above, but encompasses any and all embodiments within the scope of the following claims.

I claim:

1. A multi-pronged spear-fishing spear tip, comprising:
a collar adapted for mounting to a spear shaft, the collar having an axis;
an elongate center tine extending axially from the collar, the center tine having a length and a spear point at an end thereof which is distal of the collar, the spear point having a sharp tip, at least one foldable barb disposed on at least one side of the center tine, wherein the at least one foldable tine is biased pivotally to the at least one side of the center tine; and
at least three outer tines extending outwardly from the collar at continuous divergent angles, the outer tines surrounding the center tine so that only a single outer tine of said outer tines is coplanar with the center tine, each of the outer tines having a sharp tip, each of the outer tines having a length shorter than the length of the center tine;
wherein a difference in length between the center tine and the outer tines accommodates spearing of a wide range of sizes of fish or prey, and wherein the outer tines immobilize fish or prey already speared on the center tine.

2. The multi-pronged spear-fishing spear tip according to claim 1, wherein said collar comprises a cylinder having an internally threaded bore in one end for selective mounting to the spear shaft.

3. The multi-pronged spear-fishing spear tip according to claim 1, wherein said center tine comprises a two-part assembly including an elongate center shaft and said spear point, said spear point being selectively mounted to the center shaft.

4. The multi-pronged spear-fishing spear tip according to claim 3, wherein said elongate center shaft and said spear point comprise mating threads for detachably mounting said spear point to said center shaft.

5. The multi-pronged spear-fishing spear tip according to claim 1, wherein said center tine further comprises two foldable barbs disposed on opposite sides of said center tine.

6. The multi-pronged spear-fishing spear tip according to claim 1, wherein each of said outer tines comprises at least one barb adjacent said sharp tip thereof.

7. The multi-pronged spear-fishing spear tip according to claim 6, wherein said at least one barb of each of said outer tines further comprises two barbs disposed on opposite sides of said sharp tip thereof.

* * * * *